AFC SYSTEM WITH A BEAT FREQUENCY DRIFT CANCELLATION OSCILLATOR

Filed May 3, 1965 4 Sheets-Sheet 1

INVENTOR
PETER MAITLAND
ROGER FREDERICK EDWARD WINN
BY
ATTORNEY

INVENTOR
PETER MAITLAND
ROGER FREDERICK EDWARD WINN
BY
ATTORNEY

INVENTOR
PETER MAITLAND
ROGER FRED ERIK EDWARD WINN
BY
Suell, Michael, Bradford & Gardiner
ATTORNEY INVENTOR
PETER MAITLAND
ROGER Frederick Edward Winn
BY
[signature]
ATTORNEY United States Patent Office 3,278,855

Patented Oct. 11, 1966

3,278,855

AFC SYSTEM WITH A BEAT FREQUENCY DRIFT CANCELLATION OSCILLATOR

Peter Maitland, Crowthorne, and Roger Frederick Edward Winn, Bracknell, England, assignors to Racal Communications Limited, Bracknell, England, a British company Filed May 3, 1965, Ser. No. 452,510
6 Claims. (Cl. 331—10)

This invention relates to frequency synthesisers, that is to say, devices by which it is possible selectively to obtain any desired frequency within a range of frequencies, with a predetermined tolerance.

According to the present invention there is provided a frequency synthesiser for providing an oscillatory output of selected frequency lying within a predetermined range, comprising a variable frequency oscillator, a second oscillator a part of whose output is mixed with a part of the output of said variable frequency oscillator, the resultant lower sideband constituting said oscillatory output of selected frequency, a further part of the variable frequency oscillator output being mixed either with a further part of the second oscillator output or with a sideband resulting from a frequency change of the further part of the second oscillator output, and the resultant lower sideband, or a sideband resulting from a frequency change thereof, being mixed with oscillations of a controlled frequency selected from a source of oscillations of a plurality of different controlled frequencies to provide a control signal for adjusting the frequency of said variable frequency oscillator in such a sense as to maintain a parameter of the control signal at a predetermined value, the arrangement being such that the frequency of the oscillatory output is unaffected by variations in the frequency of said second oscillator.

Figure 1A:
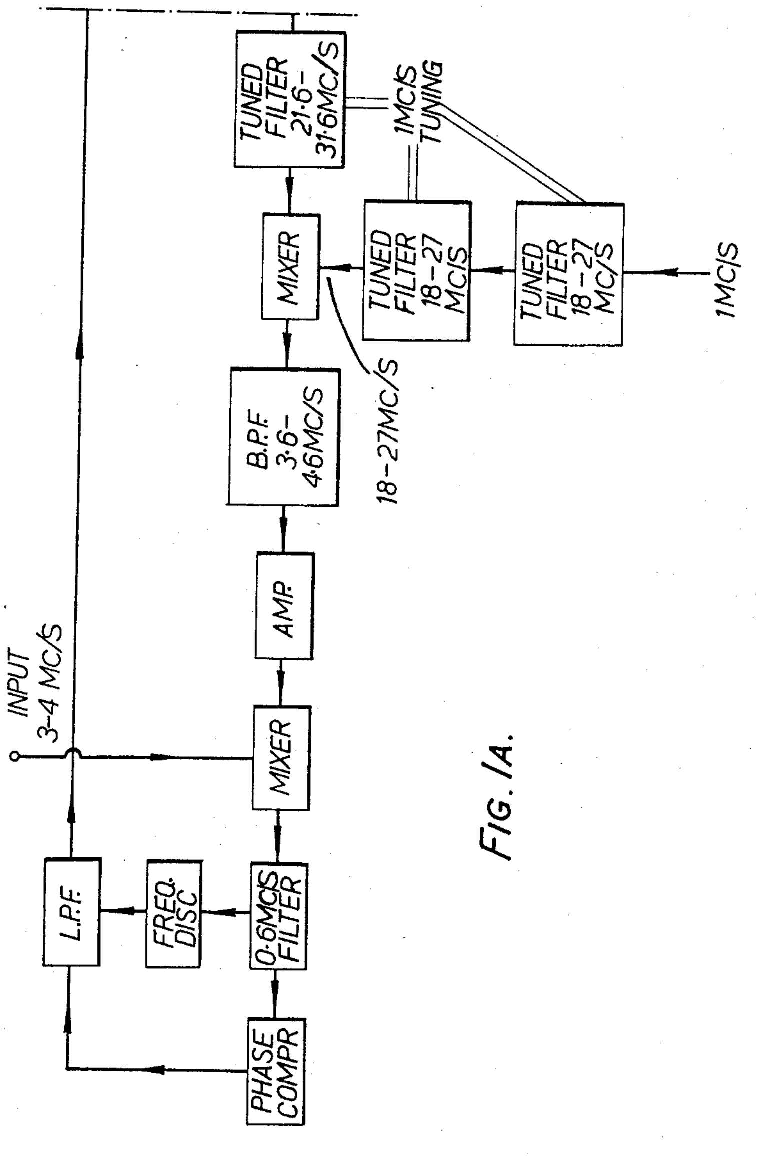
Figure 1B:
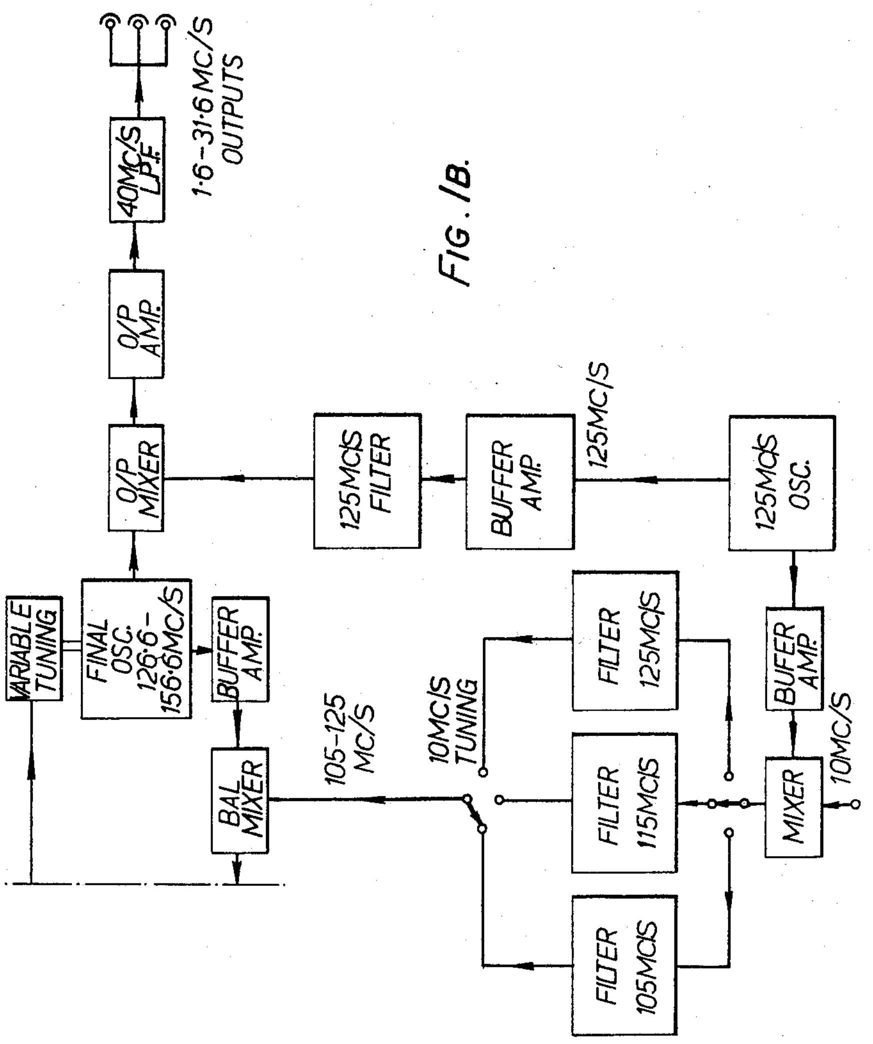
Figure 2:
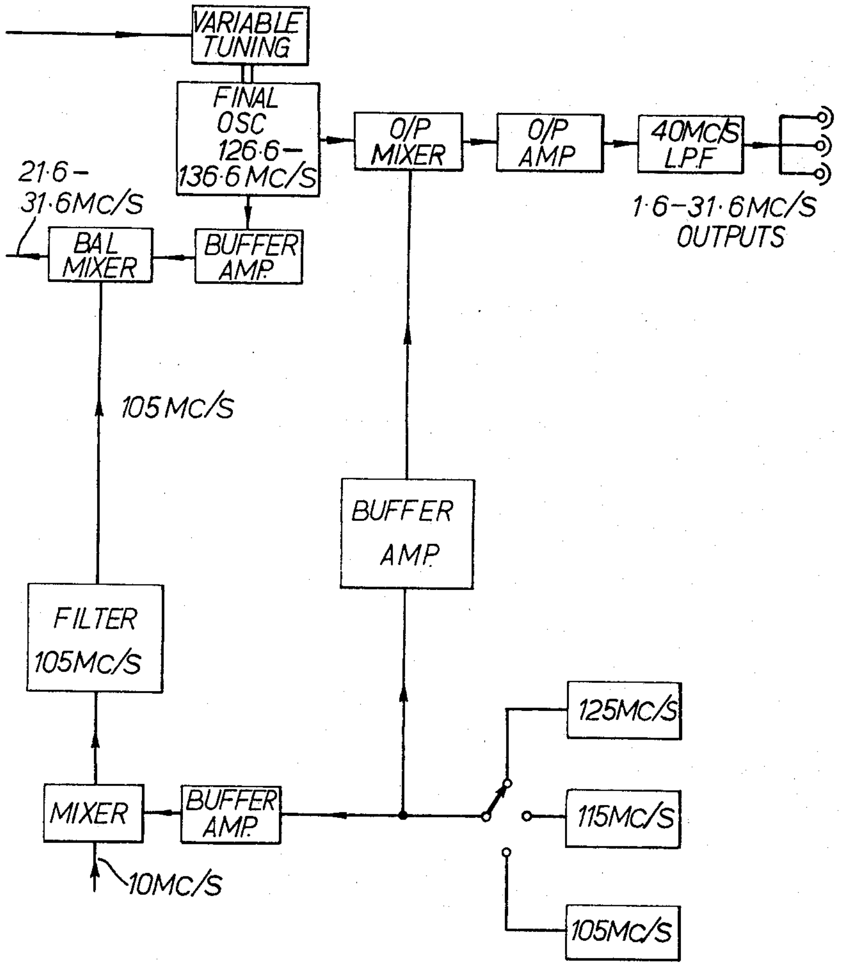
Figure 3:
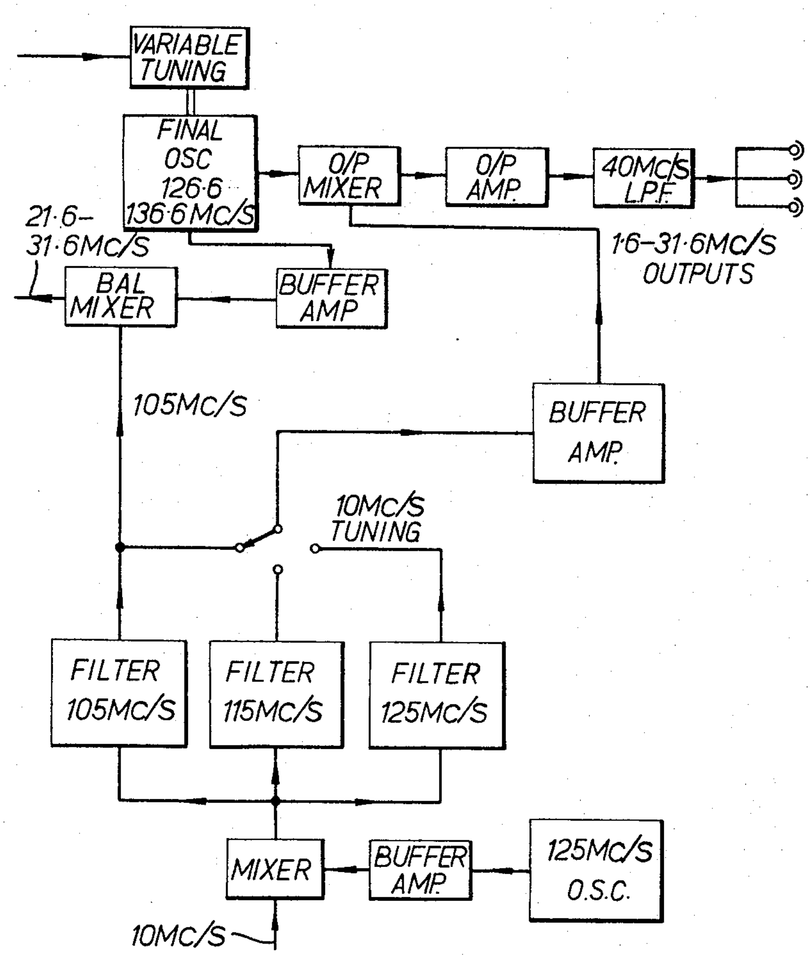

Three arrangements of frequency synthesisers in accordance with the invention will now be described, by way of example, with reference to the accompanying block diagrams in which:

FIGURES 1A and 1B represent a block diagram of the first arrangement of frequency synthesiser and FIGURES 2 and 3 are block diagrams showing the modifications to the FIGURE 1 arrangement which constitute the arrangements of FIGURES 2 and 3 respectively.

The arrangement to be described with reference to FIGURE 1 is an extension of the synthesiser described and illustrated by way of example in the complete specification and drawings of our British Patent No. 942,337. The arrangement described in that specification is designed to provide an output variable in 100 c./s. steps between 3.0 mc./s. and 4.0 mc./s. The present synthesiser is designed to receive such an input lying between 3.0 mc./s. and 4.0 mc./s. and to provide an output variable in 100 c./s. steps between 1.6 mc./s. and 31.6 mc./s. In practice both synthesisers may be a part of a single unit.

The output of 1.6 to 31.6 mc./s. is obtained from a final oscillator which is infinitely variable over a range of from 126.6 to 156.6 mc./s. The output from this final oscillator is mixed in an output mixer with a portion of the output from a stable 125 mc./s. oscillator in order to provide the desired range of output frequency, after amplification in an output amplifier and passage through a 40 mc./s. low-pass filter. The output from the 125 mc./s. oscillator is fed through a buffer amplifier and 125 mc./s. filter to the output mixer and a further portion of the output from the 125 mc./s. oscillator is also fed through a buffer amplifier to a further mixer in which it is mixed with the fundamental or second harmonic of a 10 mc./s. oscillation derived from a stabilised oscillator, selected by means of a switch.

The output from this further mixer is fed to a selected one of three filters designed to pass 105 mc./s., 115 mc./s. and 125 mc./s. respectively, the first filter being selected by setting of the synthesiser controls for the decade between 1.6 and 11.6 mc./s., the second filter being selected for the decade between 11.6 and 21.6 mc./s. and the third filter being selected for the decade between 21.6 and 31.6 mc./s. Similarly the fundamental of the 10 mc./s. oscillation is selected for the range 11.6 to 21.6 mc./s. and its second harmonic for the range 1.6 to 11.6 mc./s. The output from the selected filter is fed to a balanced mixer which also receives, via a buffer amplifier, a portion of the output from the final oscillator. It will be appreciated that due to the filter selection the balanced mixer output will always contain a sideband lying within the range 21.6 to 31.6 mc./s., this sideband being selected by a tuned filter. The tuning of this filter is effected by the setting of the synthesiser controls for the unit megacycles range, as is the tuning of two cascade tuned filters by which one of ten harmonics of a 1 mc./s. fundamental are selected. The harmonics are derived from a stabilised 1 mc./s. source and the filters are designed to select the appropriate one of the harmonics lying within the range 18 to 27 mc./s. The output from the first mentioned tuned filter is mixed with the selected harmonic and the ganging of the tuning of the three filters is such that the mixer output contains a sideband lying within the range 3.6 to 4.6 mc./s. It will be understood that one or more of the tuned filters could be replaced by ten pre-set band pass filters, each set to a different one megacycle pass band within the range 18 to 27 mc./s., the appropriate filter being selected by switching. This sideband is selected by a filter and after amplification is mixed with the input to the synthesiser which, as stated above, lies between 3.0 and 4.0 mc./s. The output from this mixer is arranged so to control the tuning of the final oscillator as to maintain the output at 0.6 mc./s. This is achieved by feeding the output through a 0.6 mc./s. filter to a phase comparator, any deviation from 0.6 mc./s. producing an output from the phase comparator which is passed through a low-pass filter to a tuning control circuit for the final oscillator, the signal applied to the tuning control circuit varying the tuning of the final oscillator to provide an input of 0.6 mc./s. to the 0.6 mc./s. filter. This tuning of the final oscillator may, for example, be by means of a voltage-sensitive capacitor whose capacitance varies in dependence upon the potential across its electrodes.

Thus, it will be seen that with an input variable over a range of 1.0 mc./s. in predetermined steps, for example of 100 cycles, the arrangement provides an output over a range of 30.0 mc./s. in steps of 100 cycles. The setting of the synthesiser controls to one of ten possible "units" of megacycles determines the tuning of the three tuned filters, whilst the setting of the controls to one of three possible "decades" of megacycles determines the selection of the appropriate one of the 105 mc./s., 115 mc./s. or 125 mc./s. filter.

The overall stability of the final output is dependent upon the stability of sources of 1 mc./s. and 10 mc./s., which may for example be controlled by a crystal oven, but is independent of the stability of the 125 mc./s. oscillator. This is because the 125 mc./s. oscillations are fed not only to the output mixer but also to the balanced mixer and the sidebands selected are such that any variations from the nominal frequency are cancelled out.

In the FIGURE 1 arrangement of frequency synthesiser the final oscillator is infinitely variable over a range of 30 mc./s. The modification shown in FIGURE 2 enables the range of this variation to be reduced, for example to 10 mc./s. whilst still giving the same output range of 30 mc./s. Thus, the range of variation of the final oscillator may now be limited to 126.6 to 136.6 mc./s., which facilitates phase locking.

This is achieved by providing in addition to the stable 125 mc./s. oscillator two further stable oscillators operating at 115 and 105 mc./s. respectively, all three oscillators for example being crystal controlled. Alternatively, a single oscillator using three switched crystals could be employed. For the output decade between 1.6 and 11.6 mc/s. the 125 mc./s. stable oscillator is selected and its output mixed with the output from the variable frequency oscillator in the output mixer, the lower sideband from which gives the desired output frequency. As before a further portion of the output from the 125 mc./s. oscillator is fed to the futher mixer in which it is mixed with the second harmonic of the 10 mc./s. oscillation to give a 105 mc./s. sideband. The latter is fed through a 105 mc./s. filter to the balanced mixer which also receives a portion of the output from the final oscillator. This will then give the desired output from the balanced mixer containing a sideband within the range 21.6 to 31.6 mc./s.

Similarly for the output frequency decade between 11.6 and 21.6 mc./s. the output from the 115 mc./s. stable oscillator will be selected and fed to the output mixer. The lower sideband resulting from the mixing of the 115 mc./s. oscillation with the fundamental of the 10 mc./s. oscillation will be fed through the 105 mc./s. filter to the balanced mixer.

For the highest decade output of 21.6 to 31.6 mc./s. the 105 mc./s. stable oscillator output will be supplied to the output mixer and the fundamental from this oscillator will be passed by the 105 mc./s. filter to the balanced mixer.

It will be noted that in each case the oscillation supplied to the output mixer is direct from the stable oscillator without frequency change, which has the advantage of avoiding the presence of spurious oscillations.

It will be understood that the frequencies quoted have been by way of example only. Thus, the local oscillator frequencies for the output mixer and the balanced mixer could be above the frequency range of the variable frequency oscillator instead of below. In this case typical frequencies would be for the variable frequency oscillator 123.4 to 133.4 mc./s., with stable oscillator frequencies of 135, 145 and 155 mc./s., the local oscillator frequency for the balanced mixer being 155 mc./s.

An alternative modification to the FIGURE 1 arrangement, which also reduces the range of variation of the variable frequency oscillator, is shown in FIGURE 3. In this modification the local oscillator frequency for the output mixer is obtained from the output of the selected one of the three filters designated to pass 105, 115 and 125 mc./s. respectively, whilst the local oscillator frequency for the balanced mixer is always obtained from the output of the 105 mc./s. filter. Thus, when the synthesiser controls are set to give an output in the decade between 1.6 and 11.6 mc./s. the output from the 125 mc./s. filter will be supplied to the output mixer. Likewise for the decade output between 11.6 and 21.6 mc./s. the output from the 115 mc./s. filter will be supplied to the local oscillator and for the final decade the output from the 105 mc./s. filter will provide the local oscillator frequency for the output mixer. It should be understood that the local oscillator frequency for the balanced mixer will always be obtained from the output from the 105 mc./s. filter. With this modified arrangement the frequency of the stable oscillator to give the local oscillator frequencies described need not be 125 mc./s. but can equally well be 115 or 105 mc./s. the required output frequencies from the filters still being present due to the mixing with the fundamental or second harmonic of the 10 mc./s. oscillatory output. Conveniently the mid-one of the three filter mid-pass frequencies will be chosen because the other two frequencies will then be provided by the upper and lower sidebands.

We claim:

1. A frequency synthesiser for providing an oscillatory output of selected frequency lying within a predetermined range, comprising
- a frequency controlled oscillator having frequency control means,
- a second oscillator,
- a first mixer, a part of the output of said frequency-controlled oscillator and a part of the output of said second oscillator being applied to said first mixer to provide a lower sideband output from said first mixer which constitutes said oscillatory output of selected frequency,
- a second mixer, a further part of the output of said frequency-controlled oscillator and a further part of the output of said second oscillator being applied to said second mixer to provide a lower sideband output from said second mixer,
- a source of oscillations of controlled frequency, and
- a third mixer, a lower sideband of the output from said second mixer and oscillations from said source of oscillations being applied to said third mixer, an output from said third mixer being applied to said frequency control means to control the frequency of said frequency-controlled oscillator.

2. A frequency synthesiser for providing an oscillatory output of selected frequency lying within a predetermined range, comprising
- a frequency-controlled oscillator having frequency control means,
- a second oscillator,
- a first mixer, a part of the output of said frequency-controlled oscillator and a part of the output of said second oscillator being applied to said first mixer to provide a lower sideband output from said first mixer which constitutes said oscillatory output of selected frequency,
- a third oscillator of stabilised fixed frequency,
- a fourth mixer, the output of said third oscillator and a further part of the output of said second oscillator being applied to said fourth mixer,
- a second mixer, a further part of the output of said frequency-controlled oscillator and a part of the output of said fourth mixer being applied to said second mixer to provide a lower sideband output from said second mixer,
- a source of oscillations of controlled frequency, and
- a third mixer, a lower sideband of the output from said second mixer and oscillations from said source of oscillations being applied to said third mixer, an output from said third mixer being applied to said frequency control means to control the frequency of said frequency-controlled oscillator.

3. A frequency synthesiser for providing an oscillatory output of selected frequency lying within a predetermined range, comprising
- a frequency-controlled oscillator having frequency control means,
- a second oscillator,
- a first mixer, a part of the output of said frequency-controlled oscillator and a part of the output of said second oscillator being applied to said first mixer to provide a lower sideband output from said first mixer which constitutes said oscillatory output of selected frequency,
- a second mixer, a further part of the output of said frequency-controlled oscillator and a further part of the output of said second oscillator being applied to said second mixer to provide a lower sideband output from said second mixer,
- a third oscillator of stabilised fixed frequency,
- a fourth mixer, the output of said third oscillator and the lower sideband output from said second mixer being applied to said fourth mixer, a source of oscillations of controlled frequency, and a third mixer, a lower sideband of the output from said fourth mixer and oscillations from said source of oscillations being applied to said third mixer, an output from said third mixer being applied to said frequency control means to control the frequency of said frequency-controlled oscillator.

4. A frequency synthesiser for providing an oscillatory output of selected frequency lying within a predetermined range, comprising a frequency-controlled oscillator having frequency control means, a second oscillator, a first mixer, a part of the output of said frequency-controlled oscillator and a part of the output of said second oscillator being applied to said first mixer to provide a lower sideband output from said first mixer which constitutes said oscillatory output of selected frequency, a third oscillator of stabilised fixed frequency, a fourth mixer, a part of the output of said third oscillator and a further part of the output of said second oscillator being applied to said fourth mixer, a second mixer, a further part of the output of said frequency-controlled oscillator and a part of the output of said fourth mixer being applied to said second mixer to provide a lower sideband output from said second mixer, a fifth mixer, the output of said second mixer and a part of the output of said third oscillator being applied to said fifth mixer, a source of oscillations of controlled frequency, a third mixer, a sideband of the output from said fifth mixer and oscillations from said source of oscillations being applied to said third mixer, the output from said third mixer being applied to said frequency control means to control the frequency of said frequency-controlled oscillator.

5. A frequency synthesiser for providing an oscillatory output of selected frequency lying within a predetermined range, comprising a frequency-controlled oscillator having frequency control means, a second oscillator, a third oscillator of stabilised fixed frequency, a fourth mixer, a part of the output of said second oscillator and a part of the output of said third oscillator being applied to said fourth mixer, a first mixer, a part of the output of said frequency-controlled oscillator and a part of the output of said fourth mixer being applied to said first mixer to provide a lower sideband output from said first mixer which constitutes said oscillatory output of selected frequency, a second mixer, a further part of the output of said frequency-controlled oscillator and a further part of the output of said fourth mixer being applied to said second mixer to provide a lower sideband output from said second mixer, a source of oscillations of controlled frequency, a third mixer, a lower sideband of the output from said second mixer and oscillations from said source of oscillations being applied to said third mixer, an output from said third mixer being applied to said frequency control means to control the frequency of said frequency-controlled oscillator.

6. A frequency synthesiser for providing an oscillatory output of selected frequency lying within a predetermined range, comprising a frequency-controlled oscillator having frequency control means, a second oscillator, a third oscillator of stabilised fixed frequency, a fourth mixer, a part of the output of said second oscillator and a part of the output of said third oscillator being applied to said fourth mixer, a first mixer, a part of the output of said frequency-controlled oscillator and a part of the output of said fourth mixer being applied to said first mixer to provide a lower sideband output from said first mixer which constitutes said oscillatory output of selected frequency, a second mixer, a further part of the output of said frequency-controlled oscillator and a further part of the output of said fourth mixer being applied to said second mixer to provide a lower sideband output from said second mixer, a fifth mixer, the output of said second mixer and a part of the output of said third oscillator being applied to said fifth mixer, a source of oscillations of controlled frequency, a third mixer, a sideband of the output from said fifth mixer and oscillations from said source of oscillations being applied to said third mixer, the output from said third mixer being applied to said frequency control means to control the frequency of said frequency-controlled oscillator.

No references cited.

ROY LAKE, *Primary Examiner.*

J. KOMINSKI, *Assistant Examiner.*